Aug. 25, 1953     J. M. JOINER, JR     2,650,354
AUTO BURGLAR ALARM
Filed Nov. 17, 1950
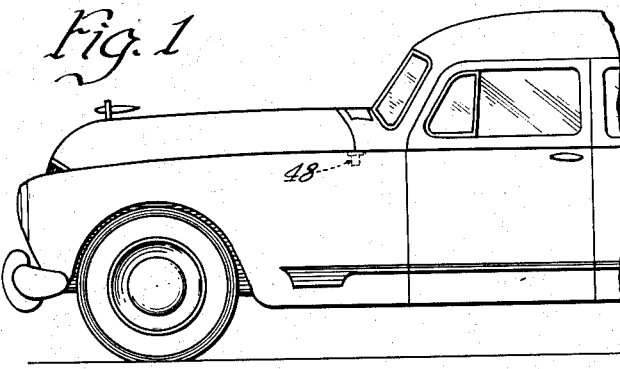
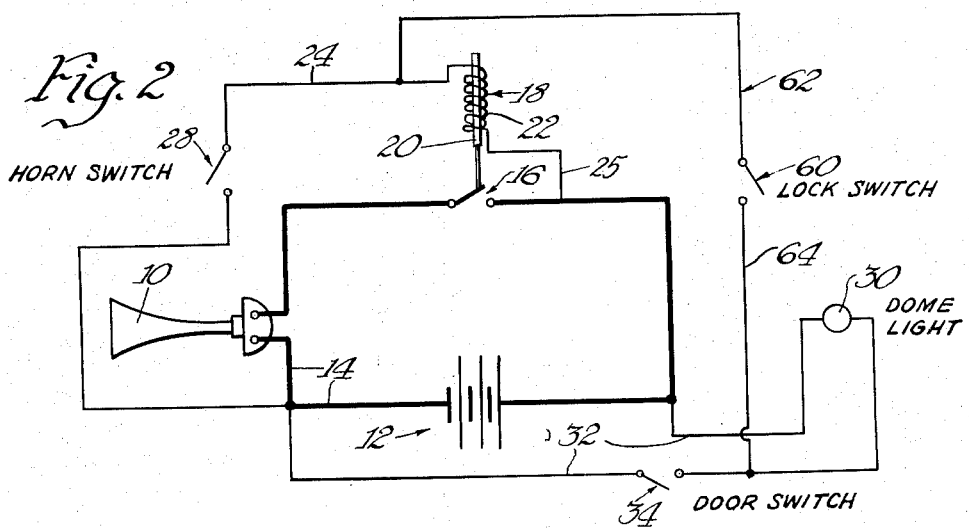
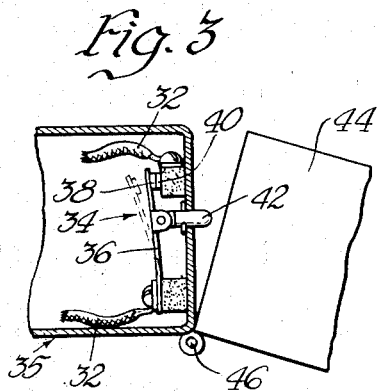
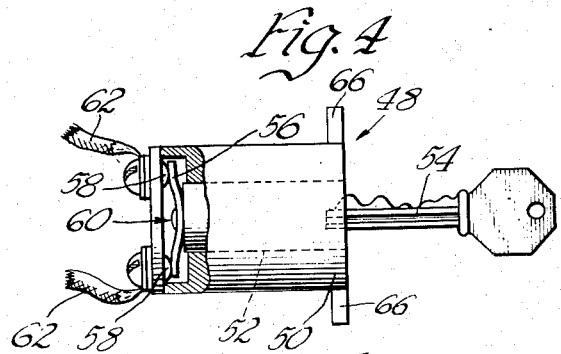
Inventor
John M. Joiner, Jr.
by Fidler, Crowe & Beardsley
Attorneys Patented Aug. 25, 1953

2,650,354

UNITED STATES PATENT OFFICE 2,650,354

AUTO BURGLAR ALARM

John Maxwell Joiner, Jr., Chicago, Ill.

Application November 17, 1950, Serial No. 196,265

2 Claims. (Cl. 340—63)

This invention relates to an alarm device for automobiles.

An object of the invention is the provision of an alarm device for an automobile for discouraging tampering with the automobile by unauthorized persons.

Another object is the provision of an automobile alarm device of such simple character that it requires only a lock switch and a small amount of wiring for connection with instrumentalities that are customarily supplied with an automobile as standard features.

Still another object is the provision of an alarm device which involves an electric circuit including the automobile horn and the customary light switch operated by the automobile door arranged, when the system is set in operative condition, to sound the horn and thereby cause an alarm when the door is opened by an unauthorized person.

Specifically, the alarm device involves an electric circuit that includes the battery, horn and door-operated light switch, all customarily supplied with an automobile as standard features, together with a key-controlled lock switch adapted to be positioned for access from the exterior of the automobile, the arrangement being such that the automobile owner can set the lock switch whereby in the event an unauthorized person succeeds in opening the door, the horn is sounded and an alarm thereby produced.

Other objects will be apparent from the following description taken in conjunction with the accompanying drawing, in which:

Figure 1 is a representation of a portion of an automobile showing a preferred location of the key-controlled lock switch to be included in the electric circuit of the automobile for forming the alarm device;

Fig. 2 is a diagram of a portion of the electric circuit of an automobile and the auxiliary circuit added thereto for establishing the alarm system;

Fig. 3 is a diagrammatic view of a portion of a door and door switch; and

Fig. 4 illustrates a lock switch.

The alarm device of the present invention is such that certain instrumentalities furnished with an automobile as standard features are utilized in forming the alarm device and the essence of the present invention is providing such an alarm device merely by providing a key-operated lock switch and a small amount of wiring to be connected in the electric circuit of the automobile for sounding an alarm when the alarm system is set in operative condition and the automobile is tampered with by an unauthorized person.

Among the standard instrumentalities or items supplied with all automobiles today is an electric horn 10 and a battery 12. The horn 10 includes a relay switch for connecting the horn in circuit with the battery. The operation of the horn requires considerable amperage and a correspondingly heavy wire and for that reason a relay switch is provided in the horn circuit for operation by a horn switch in a separate circuit that is not required to carry the heavy amperage necessary for operating the horn.

Standard horns today are provided with such relay switch embodied structurally therein; the diagram of Fig. 2 illustrates the relay switch spatially separated from the horn for the sake of a simple diagram although it is to be understood that the relay switch is physically embodied in the structure of the horn in common practice. The circuit for operating the horn is represented by the heavy lines 14 and may be referred to as the main circuit. This circuit includes the horn, battery, and relay switch 16 above referred to, operated by a relay 18 including an armature 20 and a coil winding 22. Upon appropriate actuation of the relay 18, the switch 16 is closed, closing the circuit 14 and sounding the horn.

The standard means supplied in automobiles for sounding the horn includes a horn switch and what is herein referred to as a horn circuit, including wire 24 connected at one end to the battery 12 through a wire of the main circuit 14, and at the other end to one end of the winding 22 which is provided with binding posts for the purpose. The opposite end of the winding 22 is connected through wire 26 and a wire of main circuit 14 to the opposite side of the battery. The horn circuit includes a manually operable switch 28 actuated by a horn button, and upon closing the switch 28 the relay 18 is energized which in turn closes the switch 16 thereby closing the main circuit and sounding the horn. The provision of the relay switch 16 enables the horn circuit 24 to be made up of wires that need not be heavy enough to carry the required amperage for operation of the horn.

Automobiles today are also usually provided with a dome light or other interior light. Such light is diagrammatically represented at 30, in a secondary circuit which includes wires 32 connected across the battery 12 at any convenient locations such as certain points on the main circuit 14. It is understood that the layout of the wiring in the circuit is conventional. A switch 34 is interposed in the circuit 32, this switch being commonly called a courtesy switch operated by the automobile door. The switch 34 may take any convenient structural form, Fig. 3 showing one form, but other types can be employed. In Fig. 3 the switch 34 is represented as mounted in the interior of the structure of the wall 35 of the automobile body. No attempt has been made to show details of the structure of the wall. The switch 34 includes a flexible, electrically conductive switch blade 36 anchored at one end on a wall element and having on its extended end a contact member 38 engageable with a cooperating stationary contact member 40 mounted on the wall element. The switch blade 36 is normally self-biased to switch-closed position (toward the right as viewed in Fig. 3) and adapted to be moved to switch-open position in response to force applied thereto. A plunger 42 slidably mounted in an aperture in the wall element is arranged to engage at its inner end with the switch blade 36 and with its outer end in position to be engaged by the adjacent surface of the automobile door 44 upon closing of the latter. The door 44 is hinged as at 46 to the car body. When the door is opened, the switch blade is self-biased to closed position, bringing the contacts 38 and 40 into engagement and moving the plunger 42 to the extended position shown. When the door is closed, it forces the plunger 42 inwardly, which in turn forces the switch blade 36 inwardly and opens the switch, opening the secondary circuit. Fig. 3 also illustrates conventionally how the wires 32 are connected in the switch 34. From the above it will be seen that when the door 44 is open, the interior light 30 is lighted.

The above items are provided with an automobile as standard features and the device which, according to the present invention, is to be added to the above for forming the alarm device consists of merely the key-operated lock switch represented in Fig. 4 and a small amount of wiring.

The key-operated lock switch may be of any known form, so long as it performs the inherent functions now to be described. One form of switch construction is shown at 48 in Fig. 4, the switch having a body 50 provided with rotatable cylinder 52 therein having tumblers or other locking means controlled by a key such as 54. Upon insertion of the key into the cylinder of the lock, the cylinder can be rotated to either of two positions and remain locked upon removal of the key. On the inner end of the cylinder 52 is a diametrically extending switch blade 56 appropriately insulated from the cylinder and other elements of the lock. The outer ends of the switch blade 56 are adapted in one position to engage respective switch contacts 58 insulated from the elements of the lock, and in the other of the positions the switch blade is moved out of engagement with the switch contacts, thereby respectively closing and opening the switch proper which for convenience is indicated as a whole at 60. The switch 60 is also included in the circuit diagram of Fig. 2 in what is herein referred to as an auxiliary circuit 62 made up of wires 64. One wire 64 is connected to a wire of the secondary circuit 32 and the other wire is connected to the coil winding 22 in parallel with the horn circuit 24. The switch 60 is therefore in series with the door switch 34.

The key controlled lock switch 48 is preferably mounted on the automobile in position for access thereto from the exterior, such as shown in Fig. 1. The lock switch 48 includes mounting lugs 66 for securing it to the body of the automobile. A convenient location for the lock switch is as represented in Fig. 1, namely, located under the hood or cowl with the end having the key slot exposed through an opening therein, e. g., through the parting line between the hood and adjacent element, so that the owner can insert the key into the lock from the exterior of the automobile.

If desired, the key controlled lock switch 48 may be designed for operation by the automobile ignition key for convenience to the owner in that a single key can be utilized for the ignition and the alarm device.

In normal use of the automobile the switch 60 is moved to open position which, of course, opens the auxiliary circuit 62 and normally the horn is not sounded from any source except by means of the horn switch 28. In order to set the alarm in condition for operation in the event an unauthorized person attempts to enter the car, the key controlled lock switch is turned to position for closing the switch 60. When the door is closed, the switch 34 is open and of course the auxiliary circuit 62 is open because the switch 34 is in series with the auxiliary circuit 62. Then if the door 44 should be opened, such as by an unauthorzed person in the act of entering the car, the switch 34 closes, thereby closing the auxiliary circuit 62 which energizes the relay 18 closing the switch 16 and thereby sounding the horn. This acts as an alarm and discourages tampering with the automobile by unauthorized persons.

From the above it will be seen that an alarm device can be formed merely by the employment of the key-controlled lock switch 48 and a small amount of wiring for the auxiliary circuit 62. All of the remaining elements and instrumentalities referred to are supplied with the automobile as standard features. The wires 32 for the most part are ordinarily embedded in the structure of the car body, with a portion exposed for across thereto in a location such as the back side of the dash board. The wires 64 are merely connected respectively with the appropriate wire 32 at the exposed portion of the latter, and with the appropriate binding post of the winding 22 on the horn structure, as it will be remembered that the relay switch is physically embodied in the structure of the horn.

It is believed to be entirely new to establish an alarm device by the mere provision and inclusion of such a simple element as the lock switch 48 and the small amount of wiring referred to in circuit with standard instrumentalities supplied in an automobile.

I claim:

1. An alarm device for use in an automobile having a door, a battery, a horn, a main circuit including the battery and horn, a relay switch in said main circuit, a horn circuit including a switch connected with said battery and relay switch for operating the horn, an interior light and secondary circuit including the battery and interior light, a door switch in said secondary circuit and including a pair of contacts normally biased together and separated in response to closing the door, said alarm device comprising a supplementary device including a key-controlled lock switch and wiring, said lock switch being adapted for positioning on the automobile for access from the exterior thereof and said wiring forming an auxiliary circuit, said auxiliary circuit being connected to the wires forming said secondary circuit for control by said door switch and connected to said relay switch in parallel with said horn circuit, and said lock switch being interposed in said auxiliary circuit in series with said door switch.

2. An alarm device for use in an automobile having a door, comprising a battery, a horn, a main circuit including the battery and horn, a relay switch in said main circuit, a horn circuit, including a switch, connected across said main circuit and including the battery and relay switch for operating the horn, a secondary circuit including said battery and a light to be operated by the battery and also including a door switch, said door switch being normally self-biased to closed position and adapted to be opened by the door when the latter is closed, and an auxiliary circuit consisting solely of a key-controlled lock switch and wiring, said auxiliary circuit being connected to said secondary circuit and relay switch in an arrangement in which the lock switch, door switch, battery and relay switch are disposed in series, whereby when the lock switch and door switch are both closed the horn will be operated.

JOHN MAXWELL JOINER, Jr.

References Cited in the file of this patent

UNITED STATES PATENTS

| Number | Name | Date |
|---|---|---|
| 1,131,405 | Merrill | Mar. 9, 1915 |
| 1,223,060 | Louthan | Apr. 12, 1917 |
| 1,454,216 | Eberly | May 8, 1923 |
| 1,720,230 | Murray | July 9, 1929 |
| 2,238,246 | Chapel | Apr. 15, 1946 |